(12) United States Patent
Fowler et al.

(10) Patent No.: US 8,039,082 B2
(45) Date of Patent: Oct. 18, 2011

(54) RUBBER ACCESS MAT

(76) Inventors: Shawn Fowler, Legal (CA); Gerard Hermary, Red Deer (CA); Alex Michaud, Edmonton (CA); Gordon Harper, Calgary (CA); Gary Steadman, Sherwood Park (CA)

( * ) Notice: Subject to any disclaimer, the term of this patent is extended or adjusted under 35 U.S.C. 154(b) by 0 days.

(21) Appl. No.: 10/552,556

(22) PCT Filed: Nov. 10, 2004

(86) PCT No.: PCT/CA2004/001944
§ 371 (c)(1),
(2), (4) Date: Oct. 12, 2005

(87) PCT Pub. No.: WO2006/002507
PCT Pub. Date: Jan. 12, 2006

(65) Prior Publication Data
US 2006/0286341 A1      Dec. 21, 2006

(30) Foreign Application Priority Data
Jun. 30, 2004   (CA) ..................................... 2473000

(51) Int. Cl.
*B32B 5/12*      (2006.01)
(52) U.S. Cl. ......... 428/98; 52/309.11; 273/408; 404/32; 404/36; 404/45; 428/105; 428/107; 428/114; 442/37; 442/58
(58) Field of Classification Search .................... 428/98, 428/107, 114, 105; 52/309.11; 442/37, 58; 404/32, 45, 36; 273/408
See application file for complete search history.

(56) References Cited

U.S. PATENT DOCUMENTS

| | | | |
|---|---|---|---|
| 792,979 A | | 6/1905 | Fulghum |
| 1,453,123 A | * | 4/1923 | Bickett .................... 425/403 |
| RE17,020 E | | 7/1928 | Healy |
| 2,099,149 A | | 11/1937 | Turnquist |
| 2,167,195 A | | 7/1939 | Ash |
| 2,693,102 A | | 11/1954 | Luster et al. |
| 2,999,431 A | | 9/1961 | Mitchell |
| 3,346,219 A | | 10/1967 | Salyer et al. |
| 3,462,181 A | | 8/1969 | Lewis |
| 3,657,852 A | | 4/1972 | Worthington et al. |
| 3,909,996 A | | 10/1975 | Ettlinger, Jr. et al. |
| 4,018,025 A | | 4/1977 | Collette |
| 4,037,009 A | | 7/1977 | Severinsen |
| 4,287,693 A | | 9/1981 | Collette |
| 4,289,420 A | | 9/1981 | Davis et al. |
| 4,388,484 A | | 6/1983 | York |
| 4,600,336 A | | 7/1986 | Waller, Jr. |
| 4,629,358 A | | 12/1986 | Springston et al. |

(Continued)

FOREIGN PATENT DOCUMENTS

CA         978 559         11/1975
(Continued)

*Primary Examiner* — Brent O'Hern
(74) *Attorney, Agent, or Firm* — Christensen O'Connor Johnson Kindness PLLC

(57) ABSTRACT

A rubber access mat includes a rubber slab having opposed side edges defining a width and opposed end edges defining a length. A rigidifying grid of reinforcing wire is embedded within the rubber slab. The grid consists of a plurality of parallel spaced wires extending between the opposed side edges for most of the width of the rubber slab and a plurality of parallel spaced wires extending between the opposed end edges for most of the length of the rubber slab. The reinforcing wire is not less than number ten gauge wire.

17 Claims, 2 Drawing Sheets

U.S. PATENT DOCUMENTS

| | | | |
|---|---|---|---|
| 4,888,472 A | 12/1989 | Stitz | |
| 4,946,308 A | 8/1990 | Chevalier | |
| 4,973,193 A | 11/1990 | Watson et al. | |
| 5,032,037 A | 7/1991 | Phillips et al. | |
| 5,087,149 A | 2/1992 | Waller, Jr. | |
| 5,482,754 A * | 1/1996 | Crook | 428/54 |
| 5,544,976 A | 8/1996 | Marchbanks | |
| 5,653,551 A | 8/1997 | Seaux | |
| 5,924,694 A * | 7/1999 | Kent | 273/408 |
| 6,048,129 A * | 4/2000 | Rue | 404/32 |
| 6,294,768 B1 | 9/2001 | Liebech | |
| 6,695,527 B2 | 2/2004 | Seaux et al. | |

FOREIGN PATENT DOCUMENTS

| | | |
|---|---|---|
| CA | 2 240 815 | 12/1999 |
| CH | 601 567 | 7/1978 |
| DE | 19 704 366 | 8/1998 |

* cited by examiner

RUBBER ACCESS MAT

FIELD OF THE INVENTION

The present invention relates to a rubber mat used for forming a roadway or pathway for vehicles and people in order to avoid causing environmental damage and providing a platform over unstable terrain, the access mat preferably being made from recycled vehicle tires.

BACKGROUND OF THE INVENTION

Most access mats currently in use are made from wood. Recycled tires provide an abundant source of inexpensive material for making access mats. Unfortunately, access mats made from rubber currently have limited utility. They can be used to protect a paved highway, when heavy equipment must be moved across the highway. However, they can not provide the underlying support that wood or other more rigid materials provide.

SUMMARY OF THE INVENTION

What is required is a more versatile configuration of rubber access mat.

According to the present invention there is provided a rubber access mat which includes a rubber slab having opposed side edges defining a width and opposed end edges defining a length. A rigidifying grid of reinforcing wire is embedded within the rubber slab. The grid consists of a plurality of parallel spaced wires extending continuously between the opposed side edges for most of the width of the rubber slab and a plurality of parallel spaced wires extending continuously between the opposed end edges for most of the length of the rubber slab. The reinforcing wire is not less than number ten gauge wire.

By following the teachings of the present invention, a rubber access mat can be fabricated which is capable of supporting heavy loads in soft or unstable terrain and completing with wooden and other more rigid access mats. As will hereinafter be further described, there are a number of reasons why rubber access mats can be considered to be superior to wooden access mats. The cost of wood is increasing, as our forests become depleted. At the same time, there is an environmental problem being experienced in the disposal of used vehicle tires. These used vehicle tires provide an abundance of low cost materials, so that rubber access mats made from recycled vehicular tires rubber access mats are extremely cost competitive with wood access mats. In addition, the longevity of wood mats is adversely affected by water absorption and insect infestation whereas rubber is resilient to these items whereby providing a longer life span.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
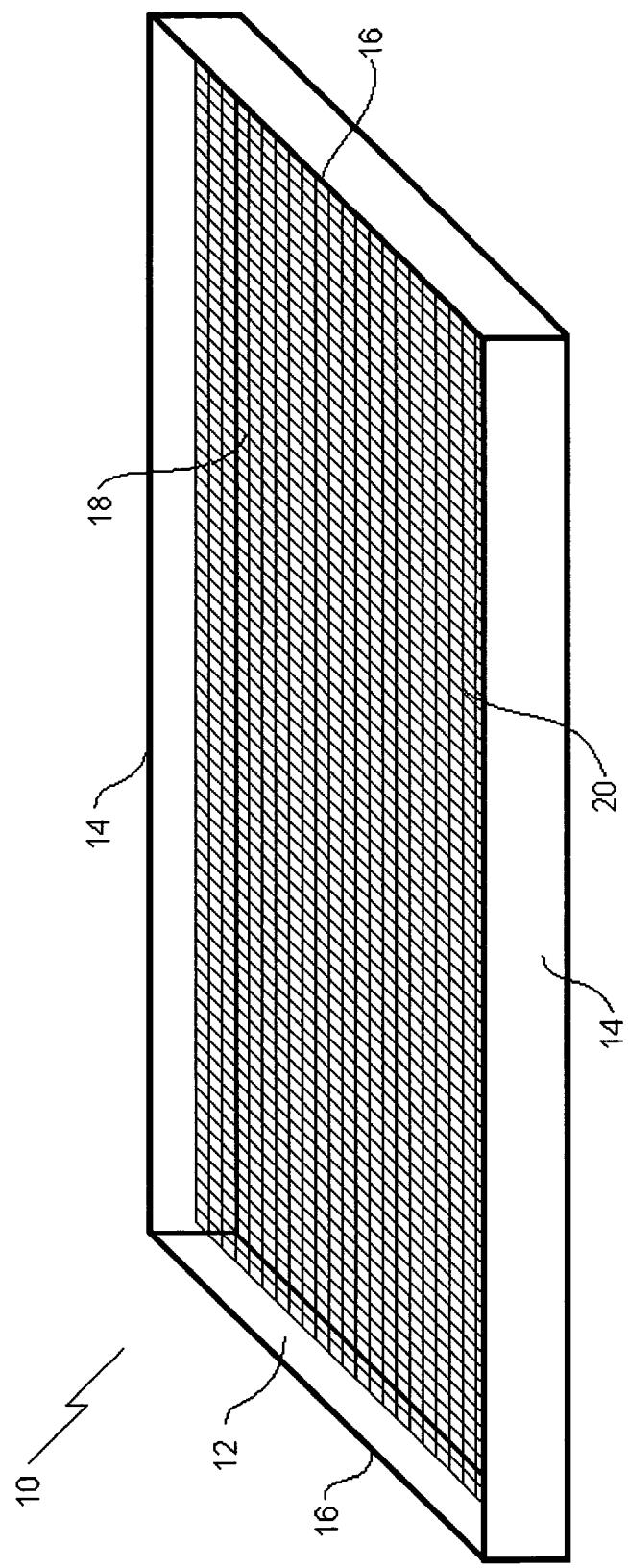
FIG. 1 is a perspective view, in section, of a rubber access mat constructed in accordance with the teachings of the present invention.

The preferred embodiment, a rubber access mat generally identified by reference numeral 10, will now be described with reference to FIG. 1.

Structure and Relationship of Parts:

Referring to FIG. 1, there is shown rubber access mat 10, including a rubber slab 12 made from recycled vehicular tires, having opposed side edges 14 defining a width and opposed end edges 16 defining a length. A rigidifying grid 18 of reinforcing wire 20 is embedded within rubber slab 12 and consists of a plurality of parallel spaced wires 20. Wires 20 extend continuously between opposed side edges 14 for most of the width of rubber slab 12 and between opposed end edges 16 for most of the length of rubber slab 12, parallel to each other in each direction. Reinforcing wire 20 is not less than number ten gauge wire, and is made of a metal with adequate strength, such as steel.

Operation:

Referring to FIG. 1, reinforcing wire 20 is embedded within rubber slab 12, which is formed from recycled vehicular tires, to form a rigidifying grid 18, where wire 20 is embedded between opposed side edges 14 in a parallel manner, and between opposed end edges 16 in a parallel manner. The rigidifying grid 18 enables rubber access mat 10 to be used in installations in which rubber access mats were previously considered to be unsuitable.

Advantages:

The results obtained through the use of wooden access mats vary with site conditions. Wooden access mats perform best when laid on soft terrain, such as muskeg and swamp. The wooden access mat provides the necessary rigidity to support a vehicle, whereas prior art rubber access mats tended to flex, fold and sink. However, the very rigidity which makes the wooden access mats suited for soft terrain, causes problems on uneven or unstable terrain, such in uneven sand or soil. When unevenly supported, the wooden access mats tend to tip back and forth like a teeter-totter. In addition, vehicle traffic will cause the mats to fracture and break when they are installed over a span.

In contrast, by altering the characteristics of the grid, rubber access mat 10 can be made with sufficient rigidity to compete with wooden mats, some rigidity while retaining sufficient flexibility and memory to conform to uneven terrain, or degrees of rigidity in between. This is accomplished by changing the gauge of wire and by changing the spacing between the wires. As will be apparent from the examples which will hereinafter be provided, one may use the same gauge of wire between the opposed side edges as is used between the opposed end edges or one may use different gauges of wire. One may use the same relative spacing between the wires between the opposed side edges as is used between the opposed end edges, or one may use different relative spacing. For each of the following examples the rubber access mats were made eight feet wide and fourteen feet long.

EXAMPLE #1

A rigid rubber access mat 10 to rival a wooden access mat:
Beneficial results have been obtained when wires 20 extending between opposed side edges 14 are steel with a number six gauge and a relative spacing of approximately two inches and wires 20 extending between opposed end edges 16 are steel with a number three gauge and a relative spacing of approximately three inches.

EXAMPLE #2

A rubber access mat 10 with some rigidity, while maintaining sufficient flexibility and memory for use on sand:

Beneficial results have been obtained when wires 20 extending between opposed side edges 14 are steel with a number ten gauge and a relative spacing of approximately four inches and wires 20 extending between opposed end edges 16 are steel with a number ten gauge and a relative spacing of approximately four inches.

EXAMPLE #3

A rubber access mat 10 which has characteristics between those of Example #1 and Example #2. This rubber access mat 10 was developed for use with ice bridges. In this application, mat 10 must have some flexibility to follow the contours of the ice bridge, but must be sufficiently rigid to provide support over portions of the ice bridge which become unstable during freeze and thaw cycles.

Beneficial results have been obtained when wires 20 extending between opposed side edges 14 are steel with a number six gauge and a relative spacing of approximately three inches and wires 20 extending between opposed end edges 16 are steel with a number six gauge and a relative spacing of approximately three inches.

Figure 2:
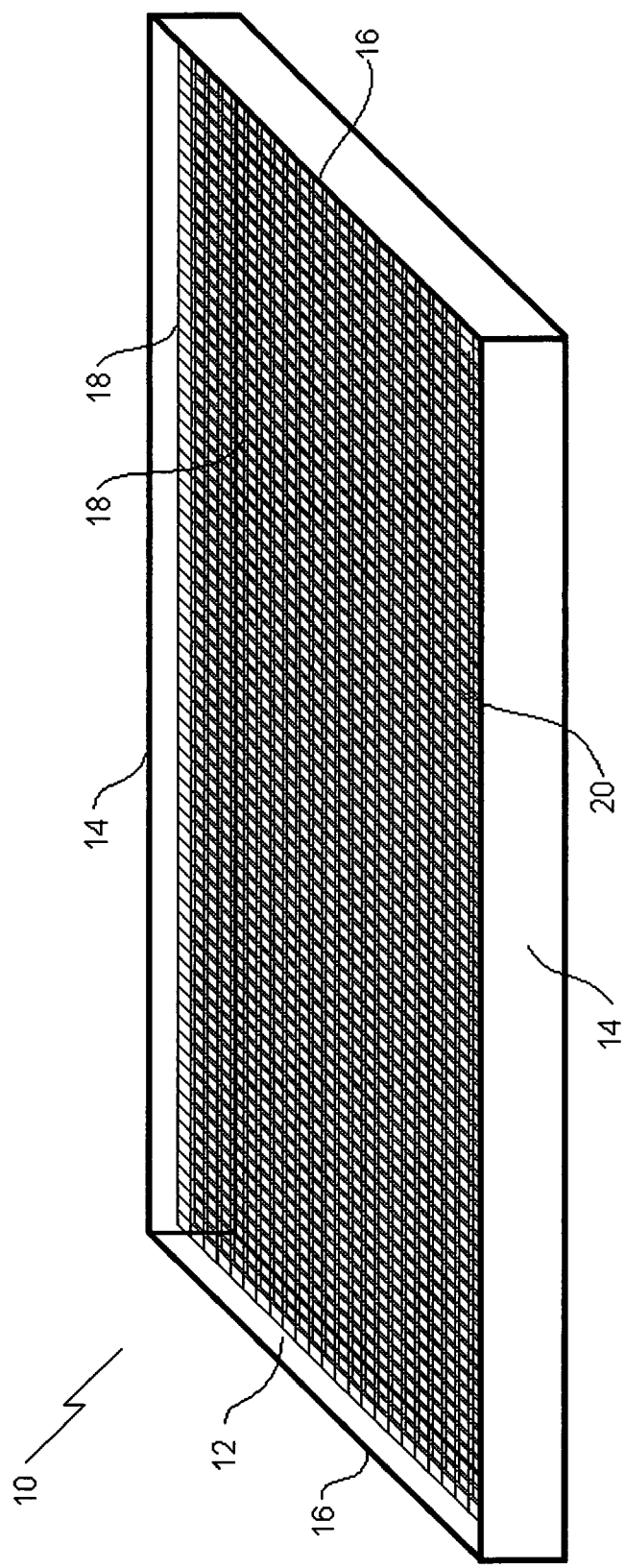
FIG. 2 is a perspective view, in section of an alternative embodiment of the access mat depicted in FIG. 1.

Variations:

It should be apparent to one skilled in the art that the examples given are only representative. The gauge of wire and spacing of the wires may be altered to give the grid desired qualities to suit the particular needs of any installation site. From the development work performed, wires having a gauge of less than ten are not believed to have utility in this application. In addition, it will be understood that the access mats 10 may be sized for use by people as sidewalks (for example, 3 feet wide and 14 feet long), by trucks (as described above), by smaller equipment and vehicles, such as an ATV, or sized to be placed under drilling rigs for levelling and stabilization purposes. In the latter case, a convenient size is 1 foot wide, 3 inches thick, and between 4 and 10 feet long. In situations where a greater load carrying capability is required, more than one rigidifying grids 18 may be used, for example, two grids 18 as shown in FIG. 2.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A rubber access mat for forming a roadway or pathway for vehicles and people, comprising:
   a flexible rubber slab made from recycled vehicular tires, the slab having a top face and a bottom face defining a thickness of 3 inches, opposed side edges defining a width and opposed end edges defining a length;
   a first rigidifying grid of reinforcing steel wire embedded within the rubber slab spaced between the top face and the bottom face and consisting of a plurality of parallel spaced steel wires embedded within the rubber slab along a first plane and extending continuously between the opposed side edges for most of the width of the rubber slab and a plurality of parallel spaced steel wires embedded within the rubber slab and extending continuously between the opposed end edges for most of the length of the rubber slab; and
   a second rigidifying grid of reinforcing steel wire embedded within the rubber slab between the top face and the first rigidifying grid and consisting of a plurality of parallel spaced steel wires embedded within the rubber slab along a second plane that is different from the first plane and extending continuously between the opposed side edges for most of the width of the rubber slab and a plurality of parallel spaced steel wires embedded within the rubber slab and extending continuously between the opposed end edges for most of the length of the rubber slab;
   wherein the diameter of the reinforcing steel wire of the first and second rigidifying grid is not smaller than number ten gauge wire in order to provide sufficient rigidity while retaining sufficient flexibility to conform to uneven terrain, and
   wherein the wires of the first and second rigidifying grids have a relative spacing between approximately 2 to 4 inches.

2. The rubber access mat as defined in claim 1, wherein the wires extending between the opposed side edges and the wires extending between the opposed end edges are the same gauge of wire.

3. The rubber access mat as defined in claim 1, wherein the wires extending between the opposed side edges and the wires extending between the opposed end edges are the different gauges of wire.

4. The rubber access mat as defined in claim 1, wherein the wires extending between the opposed side edges and the wires extending between the opposed end edges have the same relative spacing.

5. The rubber access mat as defined in claim 1, wherein the wires extending between the opposed side edges and the wires extending between the opposed end edges have different relative spacing.

6. The rubber access mat as defined in claim 1, wherein the wires extending between the opposed side edges have a number six gauge and a relative spacing of approximately two inches and the wires extending between the opposed end edges have a number three gauge and a relative spacing of approximately three inches.

7. The rubber access mat as defined in claim 1, wherein the wires extending between the opposed side edges have a number six gauge and a relative spacing of approximately two inches and the wires extending between the opposed end edges have a number six gauge and a relative spacing of approximately two inches.

8. The rubber access mat as defined in claim 1, wherein the wires extending between the opposed side edges have a number ten gauge and a relative spacing of approximately two inches and the wires extending between the opposed end edges have a number ten gauge and a relative spacing of approximately two inches.

9. A rubber access mat for forming a roadway or pathway for vehicles and people, comprising:
   a flexible rubber slab having opposed side edges defining a width and opposed end edges defining a length;

a first rigidifying grid of reinforcing wire embedded within the rubber slab and consisting of a plurality of parallel spaced wires embedded within the rubber slab along a first plane and extending between the opposed side edges for most of the width of the rubber slab and a plurality of parallel spaced wires embedded within the rubber slab and extending between the opposed end edges for most of the length of the rubber slab; and a second rigidifying grid of reinforcing wire embedded within the rubber slab and consisting of a plurality of parallel spaced wires embedded within the rubber slab along a second plane that is different from the first plane and extending between the opposed side edges for most of the width of the rubber slab and a plurality of parallel spaced wires embedded within the rubber slab and extending between the opposed end edges for most of the length of the rubber slab;

wherein the diameter of the reinforcing wire is not smaller than the diameter of number ten gauge wire in order to provide sufficient rigidity while retaining sufficient flexibility to conforms to uneven terrain, and wherein the wires of the first and second rigidifying grids have a relative spacing between approximately 2 to 4 inches.

10. The rubber access mat as defined in claim 9, wherein the wires extending between the opposed side edges and the wires extending between the opposed end edges are the same gauge of wire.

11. The rubber access mat as defined in claim 9, wherein the wires extending between the opposed side edges and the wires extending between the opposed end edges are the different gauges of wire.

12. The rubber access mat as defined in claim 9, wherein the wires extending between the opposed side edges and the wires extending between the opposed end edges have the same relative spacing.

13. The rubber access mat as defined in claim 9, wherein the wires extending between the opposed side edges and the wires extending between the opposed end edges have different relative spacing.

14. The rubber access mat as defined in claim 9, wherein the wires extending between the opposed side edges have a number six gauge and a relative spacing of approximately two inches and the wires extending between the opposed end edges have a number three gauge and a relative spacing of approximately three inches.

15. The rubber access mat as defined in claim 9, wherein the wires extending between the opposed side edges have a number six gauge and a relative spacing of approximately two inches and the wires extending between the opposed end edges have a number six gauge and a relative spacing of approximately two inches.

16. The rubber access mat as defined in claim 9, wherein the wires extending between the opposed side edges have a number ten gauge and a relative spacing of approximately two inches and the wires extending between the opposed end edges have a number ten gauge and a relative spacing of approximately two inches.

17. A roadway for vehicles and people formed of at least one rubber access mat, wherein the rubber access mat comprises:

a flexible rubber slab having opposed side edges defining a width and opposed end edges defining a length;

a first rigidifying grid of reinforcing wire embedded within the rubber slab along a first plane and consisting of a plurality of parallel spaced wires extending between the opposed side edges for most of the width of the rubber slab and a plurality of parallel spaced wires extending between the opposed end edges for most of the length of the rubber slab; and a second rigidifying grid of reinforcing wire embedded within the rubber slab along a second plane that is different from the first plane and consisting of a plurality of parallel spaced wires extending between the opposed side edges for most of the width of the rubber slab and a plurality of parallel spaced wires extending between the opposed end edges for most of the length of the rubber slab;

wherein the reinforcing wire is not less than number ten gauge wire, and wherein the wires of the first and second rigidifying grids have a relative spacing between approximately 2 to 4 inches.

\* \* \* \* \*

UNITED STATES PATENT AND TRADEMARK OFFICE
CERTIFICATE OF CORRECTION

| | | |
|---|---|---|
| PATENT NO. | : 8,039,082 B2 | |
| APPLICATION NO. | : 10/552556 | |
| DATED | : October 18, 2011 | |
| INVENTOR(S) | : Fowler et al. | |

It is certified that error appears in the above-identified patent and that said Letters Patent is hereby corrected as shown below:

| COLUMN | LINE | ERROR |
|---|---|---|
| 5 | 21 | "conforms to" should read |
| (Claim 9, | line 25) | --conform to-- |

Signed and Sealed this
Fourteenth Day of August, 2012

David J. Kappos
*Director of the United States Patent and Trademark Office*